April 25, 1944.  E. R. JOWERS  2,347,267
INSECT EXTERMINATOR
Filed Oct. 28, 1941
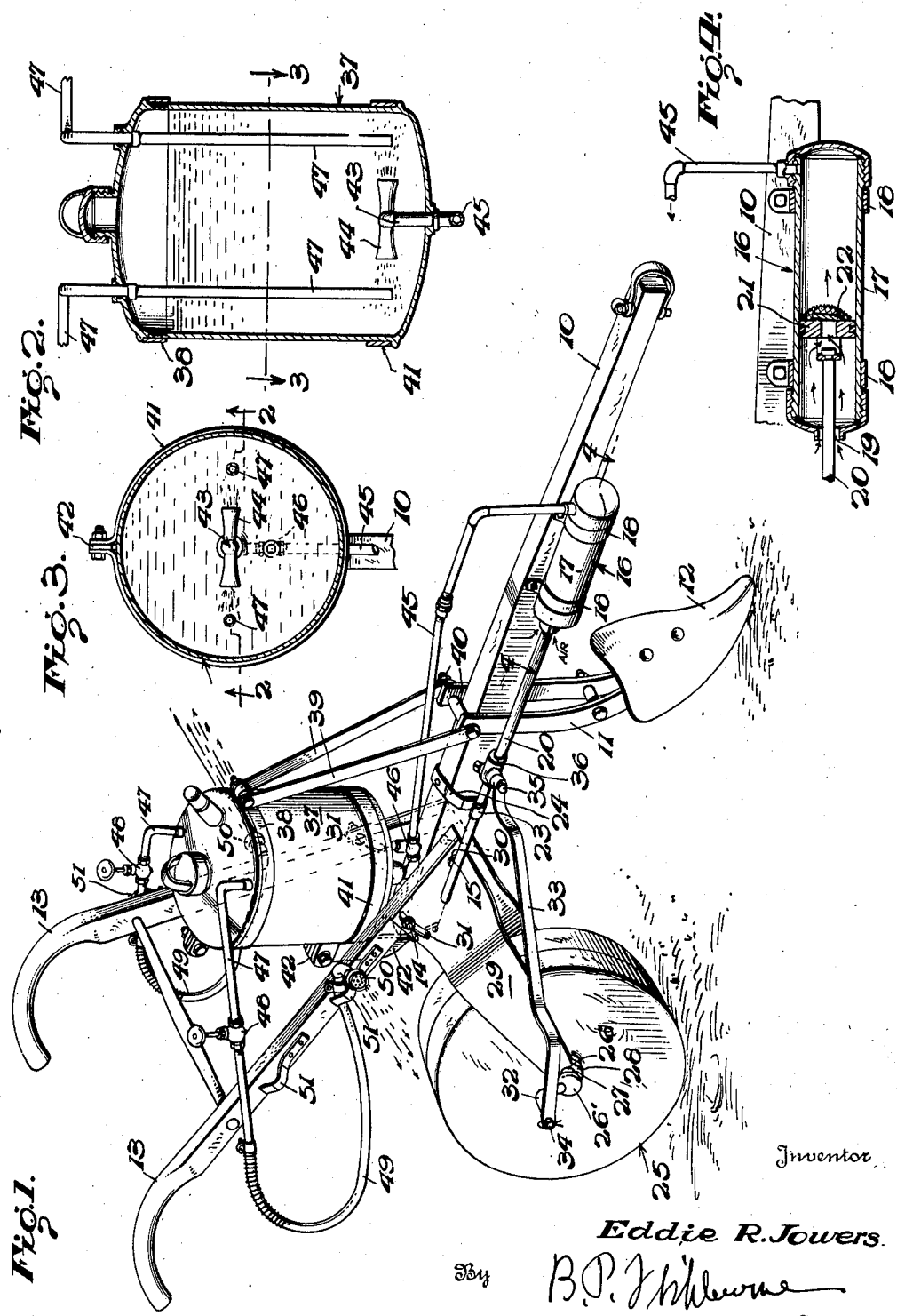
Inventor
Eddie R. Jowers.
By B. P. Fhhlewrne
Attorney Patented Apr. 25, 1944

2,347,267

UNITED STATES PATENT OFFICE 2,347,267

INSECT EXTERMINATOR

Eddie R. Jowers, Swansea, S. C.

Application October 28, 1941, Serial No. 416,879

2 Claims. (Cl. 221—77)

My invention relates to insect exterminators and has particular reference to such apparatus adapted for use in spraying plants, such as the cotton plant, tobacco plants, or the like.

An important object of the invention is to provide apparatus of the above-mentioned character operating with a liquid insecticide, for maintaining the liquid insecticide under pressure, while subjecting it to agitation whereby settling of the solid content is prevented.

A further object of the invention is to provide apparatus of the above-mentioned character which will produce jets of compressed air, adjacent to the bottom of the tank, and across the inlet ends of the outlet pipe or pipes to prevent clogging of the pipes.

Other objects and advantages of the invention will be apparent during the course of the following description.

In the accompanying drawing forming a part of this application and in which like numerals are employed to designate like parts throughout the same, Figure 1 is a perspective view of apparatus embodying my invention, Figure 2 is a transverse vertical section taken on line 2—2 of Figure 3, parts in elevation, Figure 3 is a horizontal section taken on line 3—3 of Figure 2, and, Figure 4 is a horizontal section taken on line 4—4 of Figure 1.

In the drawing, wherein for the purpose of illustration is shown a preferred embodiment of my invention, the numeral 10 designates a plow-beam, having a stock 11 rigidly secured thereto which carries a plowshare 12. Arranged at the rear end of the beam 10 are handles 13, rigidly attached to the beam 10 by bolts 14 and 15. The foregoing description is that of the conventional cultivator.

My attachment comprises a reciprocatory air pump 16, including a horizontal cylinder 17, rigidly mounted upon the beam 10 by straps 18 or the like. The forward end of this cylinder is closed while its rear end has an opening 19, for the passage of a plunger rod 20. The opening 19 is larger in diameter than the plunger rod so that air may pass into the cylinder through the opening 19. The numeral 21 designates a reciprocatory plunger rigidly mounted upon the rod 20 and operating within the cylinder 17. This plunger has a valve 22, which closes when the plunger moves forwardly toward the closed end of the cylinder 17 and opens when the plunger moves rearwardly, to admit air into the cylinder in advance of the plunger. The plunger rod has its rear end operating within a guide 23, secured to the beam 10 by a strap or bracket 24.

The numeral 25 designates a ground engaging wheel, arranged beneath the rear end of the beam 10 and this wheel is rigidly mounted upon a transverse shaft or axle 26, rotatable within openings 27 of bearings 28, formed upon segmental arms 29. Each segmental arm has an opening 30 to receive the lower bolt 15 and an elongated slot 31 to receive the upper bolt 14. It is thus apparent that the segmental arms 29 may have their lower ends raised or lowered to regulate the elevation of the wheel 25, and may be clamped to the beam 10 in the selected adjusted position by proper manipulation of the bolt 14. A crank 32 is rigidly mounted upon one end of the axle or shaft 26, to rotate therewith and this crank is pivotally connected with a connecting rod 33, at 34, and the forward end of this connecting rod is pivotally connected at 35, with a coupling 36 which is longitudinally adjustable upon the rod 20 and is clamped thereto in a selected adjusted position by means of a set screw or the like. It is thus apparent that the rotation of the wheel 25 is transmitted to the plunger 21, to reciprocate the same.

Arranged above the beam 10 and near its rear end is a liquid insecticide holding tank 37, which is air tight, so that a permanent air pressure may be built up and maintained therein. This tank is held within a band 38, clamped thereto, and the band 38 is attached to the upper ends of upstanding bars 39, the lower ends of which are attached to the stock 11 by means of a bolt 40. A lower band 41 surrounds the lower portion of the tank 37 and is clamped thereto and carries an upstanding bar 42 extending downwardly between the handles and attached to the rear end of the beam 10.

Disposed centrally within the tank 37 adjacent to its bottom is a T-nozzle or coupling 43, having an upper horizontal pipe or head 44, open at its opposite ends, to provide flaring oppositely projected jets of compressed air. The T-nozzle or coupling is connected with an air supply pipe 45, having a check valve 46 connected therein, opening toward the tank 37. The pipe 45 is connected with the inner forward closed end of the pump cylinder 17.

Extending through the top of the tank 37 are vertical liquid outlet pipes 47, the lower ends of which extend to points adjacent to the bottom of the tank but are slightly spaced from the bottom of the tank. The lower intake ends of these pipes 47 are preferably arranged slightly below the centers of the outlet ends of the pipe or head 44. The pipes 37 are arranged diametrically opposite the center of the T-nozzle 43 and are in alignment with the head 44. The intake ends of the pipes 45 therefore terminate approximately at the elevation of the pipe or head 44 and the result is that the outwardly flaring jets of compressed air are projected across and impinge against the intake end of the pipes 47. These jets of compressed air serve to continuously agitate the liquid insecticide, during the spraying operation and to also keep the intake ends of the pipes 47 means or open so that they will not clog up. The pipes 47 extend outwardly beyond the top of the tank 37 and project to the handles 13 and are preferably arranged upon the outer sides of the handles. The pipes 47 have cut-off valves 48, disposed adjacent to the handles, in convenient reach of the operator. Secured to the outlet ends of the pipes 47 are flexible hose 49 having spray nozzles 50, of any well known or preferred type, attached thereto. The flexible hose 49 are adapted to be vertically adjusted and held within selected resilient clamps 51, attached to the handles 13.

While I have shown my invention as embodied in or applied to a cultivator, which is the preferred arrangement, yet I also contemplate applying the same to a tractor or other wheeled vehicle.

The operation of the apparatus is as follows:

The spraying may be effected while the plants, such as the cotton plant, is being cultivated, in which event the plowshare 12 will be secured to the stock 11. When cultivating is not desired, the plowshare 12 is left off. The wheel 25 is adjusted to the desired elevation with respect to the beam 10 and will support the beam at the proper elevation. As the cultivator is drawn forwardly between the rows, the wheel 25 is rotated, and the plunger 21 is reciprocated for compressing the air, which is fed from the forward end of the cylinder 17 through the pipe 45. When starting, it is preferred to have the cut-off valves 48 closed so that the pump is started first and compressed air is supplied into the bottom of the tank, to place the liquid insecticide therein under pressure and also to agitate the liquid before it is discharged through the pipes 47. This procedure will eliminate the stoppage of the pipes 47 by the liquid insecticide. As is well known, liquid insecticides used to spray cotton, usually have a solid content in suspension therein which readily settles out, in the absence of agitation and this solid content quickly clogs pipes. By keeping the liquid insecticide constantly agitated before and during the period that it is discharged through the pipes 47, clogging is eliminated. The air jets projecting across the intake ends of the pipes 47 effect a mechanical washing of these intake ends thereby maintaining such ends open. The pump supplies the air pressure at the bottom of the tank, which first violently agitates the liquid at the bottom and this air pressure then rises through the liquid and is held in the top of the tank above the liquid to force the liquid through the pipes 47. When the valves 48 are opened the liquid is supplied through the nozzles 51. The nozzles are properly adjusted in position so that they face outwardly toward the sides of the cultivator and are held at the desired elevation by placing them within the selected resilient holders 51. The operator walks at the rear of the cultivator and grasps the handles 13, and is in a position to watch the action of the nozzles, to adjust the same, and also to adjust the valves 48.

It is to be understood that the form of my invention herewith shown and described is to be taken as a preferred embodiment of the same and that various changes in the shape, size, and arrangement of parts may be resorted to without departing from the spirit of my invention or the scope of the subjoined claims.

Having thus described my invention, what I claim is:

1. In apparatus for spraying cotton plants or the like, a substantially vertical tank, a substantially horizontal pipe arranged within the tank adjacent to and spaced from its bottom, the opposite ends of the pipe being open and spaced from the periphery of the tank, means to supply compressed air into the pipe between its ends, substantially vertical outlet pipes extending into the tank and having their lower intake ends disposed outwardly of and adjacent to and opposite the open ends of the substantially horizontal pipe, such intake ends terminating at approximately the elevation of the substantially horizontal pipe and spaced from the bottom of the tank, the arrangement being such that outwardly projected substantially horizontal jets from opposite ends of the substantially horizontal pipe travel across said intake ends to agitate the liquid insecticide and to clean such intake ends.

2. In apparatus for spraying cotton plants or the like, a substantially vertical cylindrical tank, a substantially horizontal pipe arranged within the cylindrical tank adjacent to and spaced from its bottom, the substantially horizontal pipe extending substantially diametrically of the substantially cylindrical tank and having its opposite open ends spaced from the periphery of the tank, means to supply compressed air into the pipe between its ends, substantially vertical outlet pipes extending into the tank and having their lower intake ends disposed outwardly of and adjacent to and opposite the open ends of the substantially horizontal pipe, such intake pipes terminating at approximately the elevation of the substantially horizontal pipe and spaced from the bottom of the tank, the arrangement being such that the substantially horizontal pipe provides outwardly projected substantially radial jets from its opposite ends which travel across said intake ends to agitate the liquid insecticide and to clean such intake ends.

EDDIE R. JOWERS.